United States Patent
Otsuka et al.

(10) Patent No.: US 9,011,976 B2
(45) Date of Patent: Apr. 21, 2015

(54) TITANIUM SHEET COVERED WITH PROTECTIVE FILM SUPERIOR IN HIGH TEMPERATURE OXIDATION RESISTANCE AND HIGH TEMPERATURE SALT DAMAGE RESISTANCE, AUTOMOBILE EXHAUST SYSTEM USING SAME, AND METHODS OF PRODUCTION OF SAME

(75) Inventors: Hiroaki Otsuka, Futtsu (JP); Hideki Fujii, Futtsu (JP); Kiyonori Tokuno, Tokyo (JP); Yoshiaki Itami, Futtsu (JP); Takashi Domoto, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 1164 days.

(21) Appl. No.: 11/992,911

(22) PCT Filed: Oct. 5, 2006

(86) PCT No.: PCT/JP2006/320348
§ 371 (c)(1),
(2), (4) Date: Mar. 31, 2008

(87) PCT Pub. No.: WO2007/043594
PCT Pub. Date: Apr. 19, 2007

(65) Prior Publication Data
US 2009/0142586 A1 Jun. 4, 2009

(30) Foreign Application Priority Data

Oct. 5, 2005 (JP) ................................ 2005-292062
Dec. 14, 2005 (JP) ................................ 2005-360114
Jun. 15, 2006 (JP) ................................ 2006-165721
Jun. 27, 2006 (JP) ................................ 2006-176348

(51) Int. Cl.
*B05D 1/12* (2006.01)
*C22C 14/00* (2006.01)
*C09D 5/10* (2006.01)
*C09D 5/18* (2006.01)
*C22F 1/18* (2006.01)
*F01N 13/16* (2010.01)
*C23C 26/00* (2006.01)

(52) U.S. Cl.
CPC ............... *C22C 14/00* (2013.01); *C09D 5/103* (2013.01); *C09D 5/18* (2013.01); *C22F 1/183* (2013.01); *F01N 13/16* (2013.01); *C23C 26/00* (2013.01)

(58) Field of Classification Search
None
See application file for complete search history.

(56) References Cited

U.S. PATENT DOCUMENTS

| 3,640,778 A * | 2/1972 | Winfree et al. ............... 148/277 |
| 4,960,817 A * | 10/1990 | Spadafora ..................... 524/440 |
| 5,395,461 A * | 3/1995 | Taki et al. ...................... 148/208 |
| 2004/0094241 A1* | 5/2004 | Kosaka et al. ................ 148/421 |
| 2005/0202271 A1* | 9/2005 | Yashiki et al. ................ 428/660 |

FOREIGN PATENT DOCUMENTS

| EP | 1491649 | 12/2004 |
| JP | 64-22404 A | 1/1989 |
| JP | 6-88208 A | 3/1994 |
| JP | 9-256138 A | 9/1997 |
| JP | 2000-308848 A | 11/2000 |
| JP | 2001-234266 A | 8/2001 |
| JP | 2003-301229 A | 10/2003 |
| JP | 2004-050772 A | 2/2004 |
| JP | 2004-115906 A | 4/2004 |
| JP | 2005-36311 A | 2/2005 |
| JP | 2006-9115 | 1/2006 |
| JP | 2006-009115 A | 1/2006 |

OTHER PUBLICATIONS

JP 2005-036311A English Machine Translation, Translated Jun. 6, 2011.*
Search Report dated Sep. 3, 2014 issued in corresponding European Application No. 06811645.8.

* cited by examiner

Primary Examiner — Adam Krupicka
(74) Attorney, Agent, or Firm — Kenyon & Kenyon LLP

(57) ABSTRACT

The present invention provides a titanium sheet covered with a protective film superior in high temperature oxidation resistance and high temperature salt damage resistance and a method of production of the same and an automobile exhaust system using the same. The titanium sheet covered with a protective film is formed on its surface with a protective film of a thickness of 1 to 100 μm where flake-shaped metal Al with an average thickness of 0.1 to 5 μm and average width or average length of 1 to 50 μm or grain-shaped metal Al with an average size of 0.1 to 30 μm is dispersed in 20 to 60 mass % silicone resin or silicone grease and comprised of Si: 15 to 55 mass % and C: 10 to 45 mass % and having a balance of unavoidable impurities. Preferably the titanium sheet of the substrate contains one or both of 0.5 to 2.1 mass % of Cu and 0.4 to 2.5 mass % of Al. The method of production is to brush or spray the above composition of a silicone resin on a titanium sheet to form a protective film and heat it at 150 to 300° C. for 5 to 60 minutes.

5 Claims, No Drawings

TITANIUM SHEET COVERED WITH PROTECTIVE FILM SUPERIOR IN HIGH TEMPERATURE OXIDATION RESISTANCE AND HIGH TEMPERATURE SALT DAMAGE RESISTANCE, AUTOMOBILE EXHAUST SYSTEM USING SAME, AND METHODS OF PRODUCTION OF SAME

TECHNICAL FIELD

The present invention relates to a titanium material used for an automobile exhaust system in four-wheeled vehicles and two-wheeled vehicles and relates as well as to a titanium sheet covered with a protective film superior in high temperature salt damage resistance able to be used for a main muffler of course, an exhaust manifold, exhaust pipe, catalytic muffler, or other location exposed to a high temperature of 600° C. or more and where heat resistance and oxidation resistance are particularly required, a method of production of the same, and an automobile exhaust system using the same.

BACKGROUND ART

Titanium materials are light in weight, yet high in strength and excellent in corrosion resistance, so are being used even for the exhaust systems of automobiles. The combustion gas discharged from the engines of automobiles and motorcycles is collected at an exhaust manifold and discharged by an exhaust pipe from an exhaust outlet at the rear of a vehicle. An exhaust pipe is formed split into several segments to enable insertion of a catalyst and muffler in the middle. In the Description, the entire system from the exhaust manifold to the exhaust pipe and exhaust outlet will be called an "exhaust system".

As the material of such an exhaust system, Japanese Unexamined Patent Publication No. 2001-234266 discloses an invention relating to a titanium alloy having both cold workability and high temperature strength. Further, as methods which form an oxidation prevention film to increase the oxidation resistance, an invention relating to coating an antioxidant including aluminum powder (see Japanese Unexamined Patent Publication No. 1-022404), an invention relating to coating Al particles, Si particles, or Al—Si alloy particles (see Japanese Unexamined Patent Publication No. 2004-115906), an invention relating to Al—Ti-based vapor deposition plating (see Japanese Unexamined Patent Publication No. 6-088208), an invention relating to a film containing Al and N (see Japanese Unexamined Patent Publication No. 9-256138), an invention relating to hot dip plating of a surface layer containing Al or Si (see Japanese Unexamined Patent Publication No. 2005-036311), and the like have been disclosed. Further, as a surface-treated titanium material superior in oxidation resistance, a titanium material formed with a fired coating layer of 5 μm or more comprised of particles comprised of pure Al or an Al alloy containing 10 at % or less of Si between which a compound comprised of a metal element M (where M is one or more types of Ti, Zr, Cr, Si, and Al) and C and/or O is filled (see Japanese Unexamined Patent Publication No. 2006-009115) is disclosed.

DISCLOSURE OF THE INVENTION

Titanium materials easily oxidize at a high temperature of 600° C. or more. The oxidation weight gain by a continuous oxidation test at 600 to 800° C. (100 to 200 hour exposure in the atmosphere at each temperature) is about 2 orders of magnitude larger compared to the ferritic stainless steel material which is generally used as an automobile exhaust system, but there is the problem that oxidation further proceeds when exposed to a high temperature of 600° C. or more in a state where chlorine ions are present compared to when there no chlorine ions are present. That is, the problem to be solved by the present invention is the problem of the progression of high temperature oxidation when chlorine ions are present (hereinafter the high temperature oxidation when there are chlorine ion present also being referred to as "high temperature salt damage", while the high temperature oxidation resistance when there are chlorine ions present also being referred to as "high temperature salt damage resistance"). Further, when using a titanium material for an automobile exhaust system, there are the problem of high temperature oxidation in the atmosphere (hereinafter referred to as the "high temperature oxidation resistance"), the problem of the progression of high temperature oxidation in the case when chlorine ions are present, the problem of whether the adhesion of the protective film is sufficient when the surface is coated by a material other than titanium to improve the oxidation resistance, and the problem of whether the protective film after heating is resistant to flaws (hereinafter referred to as "flaw resistance").

With the titanium alloy described in Japanese Unexamined Patent Publication No. 2001-234266 not given any surface treatment, there is the problem that the oxidation in the atmosphere at 600 to 800° C. is remarkable compared to the ferritic stainless SUS436 J1L (for example, Fe-17Cr-0.5Mo-0.2Ti) and the oxidation weight gain is two orders of magnitude larger. When heated to 700° C. or more in a state where chlorine ions are present, the oxidation proceeds remarkably and the high temperature salt damage resistance is remarkably insufficient. Further, the high temperature oxidation resistance also cannot be said to be sufficient.

Further, with the coating of the antioxidant according to the invention described in Japanese Unexamined Patent Publication No. 1-022404, there is the problem that the adhesion of the coated film is poor and the coated film easily peels off even with a small impact. On top of this, the high temperature salt damage resistance at 700° C. or more is insufficient.

Further, with the invention described in Japanese Unexamined Patent Publication No. 2004-115906, the Al particles and Si particles or Al—Si alloy particles have to be mixed with a fluoride flux, coated on the substrate, then heated in an inert gas environment at 600° C. or more. There is therefore the problem that the labor and costs rise.

Further, with the inventions described in Japanese Unexamined Patent Publication No. 6-088208 and Japanese Unexamined Patent Publication No. 09-256138, there are the problems that equipment for vapor deposition or sputtering or ion plating, ion implantation, or plasma spraying is necessary and that film formation after the substrate formation is difficult.

Further, with the invention described in Japanese Unexamined Patent Publication No. 2005-036311, an oxidation protective film containing 90% or more of Al or 90% or more of Al+Si (Si is 1 to 20%) is formed by the hot dip plating method. In this patent publication, it is described that methods other than the hot dip plating method, for example, coating an organic based coating containing Al flakes, are possible. However, when using an organic resin, it is difficult to make the content of Al flakes or the total content of Al and Si 90% or more. Ultimately, it can be presumed that the film formation of the invention described in this patent publication is basically by the method by hot dip plating as recommended. From this, the invention described in this patent publication has the problem that it requires a plating tank and heating and again the cost rises The titanium material formed with a fired coating layer of 5 μm or more comprised of particles comprised of pure Al or an Al alloy containing 10 at % or less of Si between which a compound comprised of a metal element M (where M is one or more types of Ti, Zr, Cr, Si, and Al) and C and/or O is filled described in Japanese Unexamined Patent Publication No. 2006-009115 had a high temperature oxidation resistance, but had the problem that the coated layer easily peeled off.

Note that the above publications lacked any description relating to the high temperature salt damage resistance.

Therefore, the present invention has as its object the provision of a titanium sheet covered with a protective film superior in high temperature oxidation resistance (high temperature salt damage resistance) and adhesion in the atmosphere and in a state where chlorine ions are present or further resistant to flaws in the coated film after being heated to a high temperature of 600° C. or more, an automobile exhaust system using this, and methods of production of the same.

The present invention intensively surveyed the component ingredients having an oxidation suppression effect at a high temperature as the protective film of a titanium material substrate. As a result, it discovered that by forming a surface layer containing Si and C on the substrate, a film having an excellent oxidation suppression effect could be obtained. Further, it discovered that by adding Al in addition to Si and C, a protective film superior in oxidation suppression effect could be further obtained. Further, it intensively surveyed and researched the component ingredients having a high temperature salt damage suppression effect as a protective film of a titanium material substrate. As a result, it discovered that by forming a protective film containing Si, C, and fine flake-shaped or powder-shaped metal Al on a substrate, a remarkable high temperature salt damage suppression effect could be obtained. Still further, it intensively surveyed and researched component ingredients having high temperature oxidation and high temperature salt damage suppression effects and superior in adhesion and flaw resistance as a protective film of a titanium material substrate. As a result, it discovered that by forming a protective film comprised of a silicone resin containing a fine flake-shaped or powder-shaped Al alloy on a substrate, a remarkable high temperature oxidation suppression effect, high temperature salt damage suppression effect, adhesion after formation of the protective film, and flaw resistance at a high temperature of 600° C. or more were obtained.

The present invention is based on such discoveries and has as its gist the following.

(1) A titanium sheet covered with a protective film superior in high temperature oxidation resistance and high temperature salt damage resistance characterized by comprising a titanium sheet on the surface of which is formed a protective film of a thickness of 1 μm to 100 μm comprising Si: 15 to 55 mass % and C: 10 to 45 mass % and having a balance of unavoidable impurities.

(2) A titanium sheet covered with a protective film superior in high temperature oxidation resistance and high temperature salt damage resistance as set forth in claim 1, characterized in that said protective film further contains Al: 20 to 60 mass %.

(3) A titanium sheet covered with a protective film superior in high temperature oxidation resistance and high temperature salt damage resistance as set forth in (2), characterized in that said protective film has said Al of metal Al of a thin flake shape with an average thickness of 0.1 to 5 μm and an average width or average length of 1 to 50 μm or of a grain shape with an average particle size of 0.1 to 30 μm dispersed in a silicone resin or silicone grease.

(4) A titanium sheet covered with a protective film superior in high temperature oxidation resistance and high temperature salt damage resistance characterized by comprising a titanium sheet on the surface of which is formed a protective film of a thickness of 1 μm to 100 μm comprising a metal Al alloy of a thin flake shape with an average thickness of 0.1 to 5 μm and an average width or average length of 1 to 50 μm or of a grain shape with an average particle size of 0.1 to 30 μm dispersed in a silicone resin in a ratio of 10 to 40 mass %, said Al alloy being one or more of an Al—Si alloy comprised of Si: 10.5 to 30 mass % and having a balance of Al and unavoidable impurities, an Al—Mg alloy comprised of Mg: 0.3 to 13.0 mass % and having a balance of Al and unavoidable impurities, and an Al—Mg—Si alloy comprised of Mg: 0.3 to 13.0 mass % and Si: 0.3 to 13.0 mass % and having a balance of Al and unavoidable impurities.

(5) A titanium sheet covered with a protective film superior in high temperature oxidation resistance and high temperature salt damage resistance as set forth in (4), characterized in that said protective film further has $SiO_2$ and/or MgO with an average particle diameter of 0.1 to 30 μm dispersed in it in a total of 0.5 to 20.0 mass %.

(6) A titanium sheet covered with a protective film superior in high temperature oxidation resistance and high temperature salt damage resistance as set forth in any one of (1) to (5), characterized in that said titanium sheet contains one or both of Cu: 0.5 to 2.1 mass % and Al: 0.4 to 2.5 mass % and has a balance of titanium and unavoidable impurities.

(7) A titanium sheet covered with a protective film superior in high temperature oxidation resistance and high temperature salt damage resistance as set forth in (6), characterized in that said titanium sheet further contains Nb: 0.3 to 1.1 mass %.

(8) A method of production of a titanium sheet covered with a protective film superior in high temperature oxidation resistance and high temperature salt damage resistance characterized by coating a silicone resin or silicone grease prepared to contain Si: 15 to 55 mass % and C: 10 to 45 mass % on a titanium sheet by brushing or spraying to form a protective film on the surface of the titanium sheet.

(9) A method of production of a titanium sheet covered with a protective film superior in high temperature oxidation resistance and high temperature salt damage resistance as set forth in (8) characterized in that said silicone resin or silicone grease further contains Al: 20 to 60 mass %.

(10) A method of production of a titanium sheet covered with a protective film superior in high temperature oxidation resistance and high temperature salt damage resistance characterized by coating a silicone resin or silicone grease, prepared by making metal Al of a thin flake shape with an average thickness of 0.1 to 5 μm and an average width or average length of 1 to 50 μm or of a grain shape with an average particle size of 0.1 to 30 μm disperse in a silicone resin or silicone grease so as to give a composition of Si: 15 to 55 mass %, C: 10 to 45 mass %, and Al: 20 to 60 mass %, on a titanium sheet by brushing or spraying and heating at 150° C. to 300° C. for 5 to 60 minutes to form a protective film on the titanium sheet surface.

(11) A method of production of a titanium sheet covered with a protective film superior in high temperature oxidation resistance and high temperature salt damage resistance characterized by coating a silicone resin, containing an Al alloy of a thin flake shape with an average thickness of 0.1 to 5 μm and an average width or average length of 1 to 50 μm or of a grain shape with an average particle size of 0.1 to 30 μm, said Al alloy being one or more of an Al—Si alloy comprised of Si: 10.5 to 30 mass % and having a balance of Al and unavoidable impurities, an Al—Mg alloy comprised of Mg: 0.3 to 13.0 mass % and having a balance of Al and unavoidable impurities, and an Al—Mg—Si alloy comprised of Mg: 0.3 to 13.0 mass % and Si: 0.3 to 13.0 mass % and having a balance of Al and unavoidable impurities, dispersed in a ratio of 10 to 40 mass %, on a titanium sheet by brushing or spraying and heating at 150° C. to 300° C. for 5 to 60 minutes to form a protective film on the titanium sheet surface.

(12) A method of production of a titanium sheet covered with a protective film superior in high temperature oxidation resistance and high temperature salt damage resistance as set forth in (11) characterized in that said silicone resin further contains $SiO_2$ and/or MgO with an average particle size of 0.1 to 30 μm in a total of 0.5 to 20.0 mass %.

(13) A method of production of a titanium sheet covered with a protective film superior in high temperature oxidation resistance and high temperature salt damage resistance as set forth in any one of (8) to (12) characterized in that said titanium sheet before covering by said protective film is a cold rolled, then vacuum annealed material.

(14) A method of production of a titanium sheet covered with a protective film superior in high temperature oxidation resistance and high temperature salt damage resistance as set forth in any one of (8) to (13) characterized by further heating said titanium sheet covered with a protective film at 600° C. to 800° C. for 30 minutes to 10 hours.

(15) A method of production of a titanium sheet covered with a protective film superior in high temperature oxidation resistance and high temperature salt damage resistance as set forth in any one of (8) to (14) characterized in that said titanium sheet contains one or both of Cu: 0.5 to 2.1 mass % and Al: 0.4 to 2.5 mass % and has a balance of titanium and unavoidable impurities.

(16) A method of production of a titanium sheet covered with a protective film superior in high temperature oxidation resistance and high temperature salt damage resistance as set forth in (15), characterized in that said titanium sheet further contains Nb: 0.3 to 1.1 mass %.

(17) An automobile exhaust system made of a titanium sheet covered with a protective film superior in high temperature oxidation resistance and high temperature salt damage resistance characterized by using a titanium sheet covered with a protective film superior in high temperature oxidation resistance and high temperature salt damage resistance as set forth in any one of (1) to (7) or a titanium member obtained by shaping said titanium sheet covered with a protective film as a component member.

(18) An automobile exhaust system made of a titanium sheet covered with a protective film superior in high temperature oxidation resistance and high temperature salt damage resistance characterized by comprising an automobile exhaust system having a protective film as set forth in (4) or (5) on inside and outside surfaces.

(19) An automobile exhaust system made of a titanium sheet covered with a protective film superior in high temperature oxidation resistance and high temperature salt damage resistance as set forth in (17) or (18) characterized by part or all of the composition of ingredients in the protective film of said titanium substrate changing to one or two of a Ti—Al intermetallic compound and Ti—Si intermetallic compound by maintenance at a high temperature along with use of said automobile exhaust system.

(20) An automobile exhaust system made of a titanium sheet covered with a protective film superior in high temperature oxidation resistance and high temperature salt damage resistance as set forth in (19) characterized in that said titanium substrate is formed on its surface with one or more of $Al_2O_3$, $SiO_2$, MgO, and TiC.

(21) A method of production of an automobile exhaust system made of a titanium sheet covered with a protective film superior in high temperature oxidation resistance and high temperature salt damage resistance characterized by coating a silicone resin containing an Al alloy of a thin flake shape or grain shape as set forth in (11) on the inside and outside surfaces of an automobile exhaust system, obtained by shaping a titanium sheet, by brushing or spraying, then heating at 150° C. to 300° C. for 5 to 60 minutes to form protective film coverings on the inside and outside surfaces.

According to the present invention, it becomes possible to provide a titanium sheet superior in high temperature oxidation resistance and high temperature salt damage resistance even at a high temperature of 600° C. or more, having sufficient strength at a high temperature, excellent in workability at room temperature, or further having flaw resistance to flaws introduced during use. If used for the exhaust system of a four-wheeled vehicle, two-wheeled vehicle, or other automobile, great advances may be made in reduction of weight. The industrial contribution is extremely remarkable.

BEST MODE FOR CARRYING OUT THE INVENTION

Below, the present invention will be explained in detail. The present invention includes a titanium sheet and a titanium member shaped from a titanium sheet. Below, the two will also be referred to together as a "titanium substrate".

The titanium sheet covered with a protective film superior in high temperature oxidation resistance and/or high temperature salt damage resistance or further superior in flaw resistance of the present invention is characterized in that a protective film of a thickness of 1 μm to 100 μm containing Si in 15 to 55 mass % and C in 10 to 40 mass % is formed on the surface of a titanium substrate.

The protective film containing Si and C acts to improve the heat resistance and oxidation resistance. Si and C are preferably coated as a silicone resin. A "silicone resin" is a straight chain polymer comprised of siloxane bonds (—Si—O— bonds) and indicates dimethyl silicone, methylphenyl silicone, or methyl hydrogen silicone. The Si and C in the silicone resin remain on the titanium sheet in the form of $SiO_2$ and TiC after being heated to a high temperature, whereby the oxidation resistance is maintained even when subsequently repeatedly heated.

Here, the content of Si contained in the protective film is 15 to 55 mass % and the content of C is 10 to 45 mass %. To form a protective film of an $SiO_2$ layer and TiC layer having sufficient oxidation resistance when heated to a high temperature, the Si content has to be 15 mass % or more and the C has to be 10 mass % or more. If Si exceeds 55 mass %, the $SiO_2$ layer becomes too thick and easily peels off, so the upper limit was made 55 mass %. Further, if C exceeds 45 mass %, the TiC layer becomes thick and the effect of oxidation resistance is saturated, so the upper limit of C was made 45 mass %.

Further, the protective film of the present invention further preferably contains Al in 20 to 60 mass %. Al is included in the protective film in the form of flakes or powder. By including Al the oxidation resistance is further improved. This remains at the substrate surface as a Ti—Al intermetallic compound in addition to $SiO_2$ and TiC when heated to a high temperature. By these covering the substrate surface, the diffusion of oxygen into the titanium substrate is remarkably suppressed and the oxidation is suppressed. Here, the content of Al contained in the protective film is 20 to 60 mass %. To form a Ti—Al intermetallic compound, a content of 20 mass % or more is necessary. If over 60 mass %, the effect becomes saturated.

Further, the titanium sheet covered with a protective film superior in high temperature oxidation resistance and high temperature salt damage resistance of the present invention is characterized by comprising a titanium sheet on the surface of which is formed a protective film of a thickness of 1 µm to 100 µm comprising flake-shaped metal Al with an average thickness of 0.1 to 5 µm and an average width or average length of 1 to 50 µm or grain-shaped metal Al with an average size of 0.1 to 30 µm dispersed in a silicone resin or silicone grease in a ratio of 20 to 60 mass %, containing Si: 15 to 55 mass % and C: 10 to 45 mass %, and having a balance of unavoidable impurities.

The elements of Al, Si, and C contained in the protective film all act to improve the high temperature oxidation resistance and high temperature salt damage resistance. The metal Al uniformly dispersed in the protective film in the form of fine flakes or grains densely covers the entire surface of the titanium substrate. When heated to a high temperature of 600° C. or more, the entire surface of the titanium substrate is covered with a Ti—Al intermetallic compound and/or $Al_2O_3$. On the other hand, Si becomes a Ti—Si intermetallic compound and/or $SiO_2$ when heated to a high temperature of 600° C. or more. These cover the Ti—Al intermetallic compound and/or $Al_2O_3$ layer. By the combination of the two, the diffusion of the oxygen in the protective film into the titanium substrate is reliably suppressed and the progression of high temperature salt damage is suppressed. These protective films remain on the titanium substrate even with subsequent repeated heating in an environment in which chlorine ions are present, so the high temperature salt damage resistance is maintained. Further, C is required for maintaining the adhesion of the protective film. Si and C are preferably coated as a silicone resin or silicone grease. A "silicone resin" is a straight chain polymer comprised of siloxane bonds (—Si—O— bonds) and indicates dimethyl silicone, methylphenyl silicone, methyl hydrogen silicone, or another straight silicone and also alkyl silicone, higher fatty acid ester silicone, and other modified silicones etc., while a "silicone grease" indicates a silicone resin base into which a thickener (fine powder of aluminum, lithium, silica, etc.), oiliness agent (higher fatty acid, ester, etc.), etc. are mixed. When coating Si and C as a silicone resin, the balance of the protective film is comprised of 0 and H and unavoidable impurities.

Here, the metal Al contained dispersed in the protective film is flake shaped with an average thickness of 0.1 to 5 µm and an average width or average length of 1 to 50 µm or grain shaped with an average size of 0.1 to 30 µm. The content is 20 to 60 mass %. Further, the Si content of the protective film is 15 to 55 mass %, while the C content is 10 to 45 mass %.

Metal Al must be included in an amount of 20 mass % or more in order to form a Ti—Al intermetallic compound and/or $Al_2O_3$. If over 60 mass %, the effect becomes saturated, so the amount was made 60 mass % or less. Further, regarding the shape of the metal Al, with flake-shaped Al, the dimensions were made an average thickness of 0.1 to 5 µm and an average width or average length of 1 to 30 µm, while with grain-shaped Al, the average size was made 0.1 to 30 µm. These sizes are the upper and lower limits for the flake-shaped or grain-shaped metal Al to be uniform in the protective film, the titanium substrate to be densely covered, and the entire surface of the titanium substrate to be formed with an Ti—Al intermetallic compound layer and/or $Al_2O_3$ when heated to a high temperature. When the average value of the size of the Al exceeds the upper limit of this range, locations where the Ti—Al intermetallic compound and/or $Al_2O_3$ are not formed occur at the titanium substrate surface and high temperature salt damage progresses. If fine metal Al, the entire surface of the titanium substrate is covered and the entire surface is formed with a Ti—Al intermetallic compound and/or $Al_2O_3$, but in practice manufacture of flake shapes with a thickness of less than an average 0.1 µm or particles with an average size of less than 0.1 µm is difficult, so the lower limit of the thickness and diameter of the Al flakes and grains was made 0.1 µm. To make the metal Al in the protective film uniformly disperse, it is preferable that 70% or more of the metal Al in the protective film fall in this range of dimensions.

To form an $SiO_2$ layer and/or Ti—Si intermetallic compound having sufficient high temperature salt damage resistance when heated to a high temperature over the entire surface, the Si content must be 15 mass % or more. On the other hand, if Si is over 55 mass %, the $SiO_2$ layer and/or layer of Ti—Si intermetallic compound becomes too thick and easily peels off, so the upper limit was made 55 mass %.

C has to be 10 mass % or more to maintain the adhesion of the protective film. Further, if C exceeds 45 mass %, the effect becomes saturated, so the upper limit of C was made 45 mass %.

Further, the titanium sheet covered with a protective film of the present invention is characterized in that it has a protective film of a thickness of 1 µm to 100 µm, in which flake-shaped Al alloy with an average thickness of 0.1 to 5 µm and an average width or average length of 1 to 50 µm and/or grain-shaped Al alloy with an average particle size of 0.1 to 30 µm is dispersed in a silicone resin in a ratio of 10 to 40 mass %, formed on the surface of the titanium sheet, said Al alloy comprising one or more of an Al—Si alloy containing Si: 10.5 mass % to 30.0 mass % and having a balance of Al and unavoidable impurities, an Al—Mg alloy containing Mg: 0.3 to 13.0 mass % and having a balance of Al and unavoidable impurities, and an Al—Mg—Si alloy containing Mg: 0.3 to 13.0 mass % and Si: 0.3 to 13.0 mass % and having a balance of Al and unavoidable impurities and is superior in high temperature oxidation resistance, high temperature salt damage resistance, adhesion, and flaw resistance.

The Al—Si alloy, Al—Mg alloy, and/or Al—Mg—Si alloy dispersed in the protective film as fine particles densely cover the surface of the titanium substrate. The particles may be shaped as grains (spherical) and also flakes or irregular shapes (for example, shapes after crushing rocks). Note that the average particle size, in the case of an irregular shape, indicates the length of the line segment connecting the most prominent locations sticking out.

These Al-based alloys are made to disperse in the silicone resin and cover the titanium sheet surface. Silicone has a suitable viscosity, so is suitable as a resin for causing dispersion of an Al alloy and further as a coating material.

When the titanium sheet covered with a protective film is heated to a high temperature of 600° C. or more, the Al—Si alloy, Al—Mg alloy, and/or Al—Mg—Si alloy in the protective film react with the titanium sheet whereby they cover the surface of the titanium sheet in the form of one or more of Ti—Al intermetallic compounds, $Al_2O_3$, Ti—Si intermetallic compounds, $SiO_2$, and MgO. On the other hand, the Si contained in silicone also becomes a Ti—Si intermetallic compound and/or $SiO_2$ when heated to a high temperature of 600° C. or more and covers the surface of the titanium substrate together with the Ti—Al intermetallic compounds and $Al_2O_3$, MgO, etc. By the two combined, the diffusion of the oxygen in the protective film to the titanium substrate is reliably suppressed and the progression of high temperature oxidation and high temperature salt damage is suppressed. These protective films remain on the titanium substrate even with subsequent repeated heating in an environment in which chlorine ions are present, so the high temperature salt damage resistance is maintained.

In this invention, the substance dispersed in the protective film as fine particles is made an Al—Si alloy, Al—Mg alloy, or Al—Mg—Si alloy containing Si and Mg in predetermined amounts or more. Due to this, compared with the case where pure Al or an Al—Si alloy with an Si content of less than 10.5 mass % is dispersed in the protective film, a protective film more superior in durability and with a high temperature salt damage resistance is obtained. That is, even if the protective film becomes flawed after being heated to a temperature of 600° C. or more, sufficient high temperature salt damage resistance is obtained. This is because the Ti—Al and Ti—Si intermetallic compound layer and MgO formed from the Al—Si alloy or Al—Mg alloy and/or Al—Mg—Si alloy are denser compared with the intermetallic compound layer formed from pure Al or an Al—Si alloy with an Si content of less than 10.5 mass %. The Al alloy dispersed in the silicone is one or more of an Al-10.5 to 30.0 mass % Si alloy, Al-0.3 to 13.0 mass % Mg alloy, and Al-0.3 to 13.0 mass % Mg-0.3 to 13.0 mass % Si alloy dispersed in a total of 10 to 40 mass %.

If making the Si content 10.5 mass % or more in Al-10.5 to 30.0 mass % Si, a dense intermetallic compound layer superior in flaw resistance and superior in high temperature oxidation resistance and high temperature salt damage resistance is formed at the interface of the protective film and matrix material after high temperature heating. If Si exceeds 30.0 mass %, the density of the protective film deteriorates. Along with this, the flaw resistance of the protective film after heating deteriorates and the high temperature oxidation characteristic and high temperature salt damage characteristic deteriorate.

When the Mg and Si in the Al-0.3 to 13.0 mass % Mg alloy and Al-0.3 to 13.0 mass % Mg-0.3 to 13.0 mass % Si alloy are also heated to a high temperature, MgO and $SiO_2$ are formed and the high temperature oxidation resistance is improved. Here, the contents of the Mg and Si of the Al—Mg alloy and Al—Mg—Si alloy were all made 0.3 to 13.0 mass % because if less than 0.3 mass %, the MgO or $SiO_2$ contributing to the high temperature oxidation resistance are not sufficiently formed, while if over 13.0 mass %, the effect becomes saturated.

The Al—Si alloy, Al—Mg alloy, and Al—Mg—Si alloy contained dispersed in the protective film is of a flake shape with an average thickness of 0.1 to 5 μm and an average width or average length of 1 to 50 μm and/or a grain shape with an average particle size of 0.1 to 30 μm. The average thickness, average width or average length, and average particle size defined are the upper and lower limits set so that the flake-shaped or grain-shaped dispersed substances are uniform in the protective film, the titanium substrate is densely covered, and, when heated to a high temperature, the entire titanium substrate is formed with a Ti—Al intermetallic compound layer, Ti—Si intermetallic compound, and/or $Al_2O_3$, $SiO_2$, and MgO. When the average value of the size of the dispersed substances exceeds the upper limit of the range, spottiness easily occurs when sprayed mixed with a solvent. When extremely large, spraying itself becomes difficult. On the other hand, manufacturing flakes with an average thickness of less than 0.1 μm or grains with an average diameter of 0.1 μm is difficult, so the lower limit of the thickness and diameter of the dispersed substances was made 0.1 μm. To make the substances dispersed in the protective film evenly disperse, it is preferable that 70% or more of the substances dispersed in the protective film fall in this range of dimensions.

The ratio of the total content of the Al alloys to the protective film as a whole was made 10 to 40 mass % because if less than 10 mass %, the production of the Ti—Al intermetallic compounds is small and the high temperature salt damage resistance is not sufficient, while if over 40 mass %, the content of silicone falls and the adhesion of the protective film drops.

The silicone used in the protective film of the present invention is sometimes called a "silicone resin" or "silicone oil", but here will be referred to as "silicone". A silicone is a straight chain polymer comprised of siloxane bonds (—Si—O— bonds) and indicates dimethyl silicone, methylphenyl silicone, methyl hydrogen silicone, or another straight silicone and also alkyl silicone, higher fatty acid ester silicone, and other modified silicones etc.

By adding $SiO_2$ and MgO in the protective film as well, the protective film is improved in high temperature oxidation resistance, high temperature salt damage resistance, and flaw resistance. In particular, the high temperature salt damage resistance at 700° C. or more is improved. The $SiO_2$ and MgO added may also be supplied in the form of hydrous magnesium silicate ($(MgO)_3(SiO_2)_4H_2O$). The total of these contents was made 0.5 to 20.0 mass % because if less than 0.5 mass %, the effect of high temperature salt damage resistance at 700° C. or more is insufficient, while if over 20.0 mass %, the effect becomes saturated.

The average particle size of the $SiO_2$ and MgO contained in the protective film is made 0.1 to 30 μm. By this particle size range, when heated to a high temperature, the entire surface of the titanium substrate is formed with a Ti—Al intermetallic compounds layer, Ti—Si intermetallic compound, and/or $Al_2O_3$, $SiO_2$, or MgO and the titanium substrate is densely covered.

To obtain a high temperature oxidation resistance and high temperature salt damage resistance effect, it is sufficient that the protective film of the present invention, even if small in amount, be evenly coated on the surface. The thickness was made 1 μm or more because uniformly coating a protective film at a thickness of less than 1 μm on a surface is difficult. If coating it over 100 μm, the effect of high temperature oxidation resistance and prevention of high temperature salt damage becomes saturated and the coating is not only wasted, but easily peels off, so the thickness was made 100 μm or less. Note that a "protective film" means a solid covering formed on a substrate surface and indicates the covering after the solvent which had been contained in the coating material at the time of coating completely evaporates.

The protective film of the present invention may be formed by adjusting the amounts of Si, C, or further metal Al in the silicone resin or silicone grease or adjusting the amount of Al alloy in the silicone resin to give a predetermined composition, adding a solvent to this to obtain a coating for a protective film, coating this on the titanium substrate, and drying or heating this. Note that the contents of Si and C of the protective film are adjusted by selecting the type of the silicone resin or adding additives to the silicone resin. For example, dimethyl silicone mainly has methyl groups at its side chain, while methylphenyl silicone mainly has phenyl groups at its side chains, so the amount of C is large. On the other hand, methyl hydrogen silicone has H at one side of its side chain, so the ratio of the amount of Si becomes greater. Further, by adding silica or another thickener or talc (magnesium silicate containing about 60% of silica) to the silicone resin, it is possible to adjust the amount of Si.

The protective film of the present invention is preferably formed on the titanium substrate by brushing or spraying. By mixing predetermined ingredients of the protective film and a solvent such as toluene, xylene, and ethyl benzene, brushing or spraying becomes possible. These solvents evaporate upon drying after brushing or spraying (room temperature, several hours) or upon heating, whereby the silicone resin is cured and the adhesion with the titanium substrate is raised. The heating after coating is preferably performed at a temperature of 150 to 300° C. for 5 to 60 minutes. This is because if the heating temperature is less than 150° C., the adhesion of the protective film becomes insufficient, while even if over 300° C., the adhesion does not change, so the temperature was made 150 to 300° C. Further, the heating time was made 5 minutes or more because if less than 5 minutes, the solvent will not sufficiently evaporate and the adhesion of the protective film will become insufficient, while even if over 60 minutes, the adhesion of the protective film does not change.

The adhesion of the protective film differs depending on the surface shape of the substrate. For example, if the surface of the substrate is pickled skin, the adhesion of the protective film is poor. Further, the techniques performed in the case of general steel sheet for increasing the surface area, that is shot blasting and sandblasting, also conversely cause the adhesion to deteriorate. On the other hand, the surface of a cold rolled material has a high adhesion with a protective film. This is because the surface has streak-like sharp relief shapes. The height difference of the relief shapes is 2 to 5 μm, and the interval between projections and depressions is about 20 to 100 μm. These fine, sharp relief shapes are believed to raise the adhesion of the protective film. The adhesion of the protective film is sufficiently obtained with just cold rolling, but a substrate requires sufficient elongation, so is annealed after cold rolling. An annealing temperature of 600° C. to 750° C. and a time of several hours to tens of hours are preferable. Using a titanium sheet cold rolled, then annealed in this way is preferable in terms of the adhesion of the protective film and the material characteristics of the titanium sheet.

The adhesion of the protective film was evaluated by a cross cut tape peeling test and a Dupont type impact test (both based on JIS K 5600).

To make the high temperature oxidation resistance and high temperature salt damage resistance by the protective film further sufficient, it is effective to heat the titanium sheet covered with a protective film at 600° C. to 800° C. for 30 minutes to 10 hours. Due to this heating, $Al_2O_3$ and $SiO_2$ are densely formed in addition to the Ti—Al intermetallic compounds and Ti—Si intermetallic compounds at the interface of the protective film and titanium substrate. By the titanium substrate being covered by these protective films, the protective film exhibits a particularly superior high temperature oxidation resistance and high temperature salt damage resistance. If heating in an environment where chlorine ions are present to 600° C. or more, these substances are formed at the interface and a high temperature salt damage resistance is exhibited, but by forming a dense protective film in advance, a higher reliability high temperature salt damage resistance is obtained. To form these substances, heating at 600° C. or more for 30 minutes or more is necessary. If over 800° C., the substrate remarkably softens, so the upper limit of the heating temperature was made 800° C. Further, if over 10 hours, the effect is saturated, so the time was made 10 hours or less.

Note that in the analysis of the composition of the protective film referred to here, the analysis of the C and the analysis of the metal elements were performed as follows:

The content of C is found by the heating and melting thermoelectric conductivity method instantaneously applying oxygen gas to a sample to cause it to completely oxidize and form $CO_2$ gas and detecting the thermal conductivity difference between this and the carrier gas. The contents of the C, H, and N contained in the sample are simultaneously detected by this method. For example, this can be measured by using EA-1108 made by FISONS.

Further, Si, Al, and other metal elements are analyzed by fluorescent X-ray analysis (based on JIS K 0119). Specifically, a protective film was coated on filter paper, allowed to sufficiently dry at room temperature for 2 days, and analyzed by fluorescent X-ray analysis. The contents of the metal elements were found by subtracting the total of the previously found contents of C, H, and N and the content of O found by the separate inert gas melting infrared adsorption method (based on JIS H 1620) from 100 mass % and dividing the remaining percentage by the contents of metal elements found by fluorescent X-ray analysis.

The high temperature oxidation resistance and/or high temperature salt damage resistance are provided by the protective film, so the substrate can be suitably selected from pure titanium and a titanium alloy able to be shaped into a sheet, but with pure titanium, the high temperature strength at 600° C. or more is insufficient, so from the viewpoint of the high temperature strength and the workability at room temperature, a titanium alloy substrate with a 0.2% yield strength at 600 to 800° C. of 1.5 times or more that of pure titanium type 2 (JIS H 4600) and, since workability at room temperature is also required, with an elongation (C direction) of 30% or more is preferable. As such a titanium alloy substrate, in the present invention, a Ti-0.5 to 2.1 mass % Cu alloy, Ti-0.4 to 2.5 mass % Al alloy, and Ti-0.5 to 2.1 mass % Cu-0.4 to 2.5 mass % Al alloy, Ti-0.5 to 2.1 mass % Cu-0.3 to 1.1 mass % Nb alloy, Ti-0.4 to 2.5 mass % Al-0.3 to 1.1 mass % Nb alloy, and Ti-0.5 to 2.1 mass % Cu-0.4 to 2.5 mass % Al-0.3 to 1.1 mass % Nb alloy can be suitably selected. The lower limits of the Cu and Al contents in these alloys are 0.5 mass % and 0.4 mass %, respectively. These contents are necessary so that the 0.2% yield strength at 600 to 800° C. becomes 1.5 times or more that of pure titanium type 2.

Further, the content of Cu was made 2.1 mass % or less because if included over 2.1 mass %, the Cu easily segregates at the time of melting. Further, the content of Al was made 2.5 mass % or less because if included over 2.5 mass %, the strength at room temperature rises and over 30% elongation can no longer be obtained.

Further, Nb was included in 0.3 to 1.1 mass % because the inclusion of Nb further improves the high temperature salt damage resistance. To improve the high temperature salt damage resistance, a content of 0.3 mass % or more is necessary. With a content over 1.1 mass %, the effect relating to the high temperature salt damage resistance is saturated.

As the titanium sheet used as the substrate of the present invention, when used for the titanium material for an automobile exhaust system, a material with a high strength at a high temperature and a good workability at room temperature is suitable, but when only a high temperature salt damage resistance is requested, even materials other than the titanium substrate described in the present invention are effective as can be easily imagined. For example, even a Ti-6Al-4V, Ti-3Al-2.5V, Ti-15V-3Cr-3Al-3Sn, or other titanium alloy sheet can be given a high temperature salt damage resistance.

The titanium sheet covered with a protective film of the present invention exhibits superior effects if used for an automobile exhaust system.

As parts of the automobile exhaust system produced using the titanium sheet of the present invention, a main muffler, exhaust manifold, exhaust pipe, etc. of a two-wheeled vehicle, four-wheeled vehicle, or other automobile may be mentioned. In the present invention, as explained above, a protective film superior in high temperature salt damage resistance at a high temperature in the atmosphere can be formed by an easy method such as brushing or spraying, so it is possible to perform the coating not only on a titanium sheet, but also after shaping the titanium sheet into an automobile exhaust system.

That is, it is also possible to use a titanium sheet covered with a protective film or a component member obtained by shaping this titanium sheet for an automobile exhaust system made of a titanium sheet covered with protective film. Further, it is possible to use a titanium sheet formed with protective films on both of its surfaces or a component member obtained by shaping this titanium sheet to form an automobile exhaust system made of a titanium sheet covered with a protective film having protective films at its inside and outside surfaces.

Furthermore, it is possible to use a titanium sheet before coverage by a protective film or a component member obtained by shaping a titanium sheet to form an automobile exhaust system made of a titanium sheet, then coat the above protective film covering coating on the inside and outside surfaces of the titanium sheet or component member to obtain an automobile exhaust system made from a titanium sheet covered with a protective film having protective films on its inside and outside surfaces.

In this way, the automobile exhaust system made from a titanium sheet covered with a protective film of the present invention is characterized by having the protective film of the present invention at the inside and outside surfaces of the automobile exhaust system made of a titanium sheet. A titanium sheet is shaped to form an automobile exhaust system made of a titanium sheet, then the protective film of the present invention is formed on the inside and outside surfaces.

Further, the automobile exhaust system made from a titanium sheet covered with a protective film of the present invention is characterized by using the titanium sheet covered with a protective film of the present invention or a titanium member obtained by shaping said titanium sheet covered with a protective film as a component member. A protective film is formed on the titanium sheet surface to form a titanium sheet covered with a protective film of the present invention, then this titanium sheet covered with a protective film is shaped to obtain a component member of an automobile exhaust system.

The automobile exhaust system made from a titanium sheet covered with a protective film of the present invention is characterized by part or all of the composition of ingredients in said protective film changing to one or more of $Al_2O_3$, $SiO_2$, MgO, a Ti—Al intermetallic compound, and Ti—Si intermetallic compound due to maintenance at a high temperature along with use of the automobile exhaust system. An automobile exhaust system is exposed to a high temperature over 600° C. when used placed in an automobile. At this time, the Al—Si alloy, Al—Mg alloy, and/or Al—Mg—Si alloy in the protective film covering the surface of automobile exhaust system made of a titanium sheet and Si contained in the silicone resin react with the titanium sheet or oxidize to cover the surface of the titanium sheet in the form of one or more of a Ti—Al intermetallic compound, $Al_2O_3$, Ti—Si intermetallic compound, $SiO_2$, and MgO. These protective films remain on the titanium substrate even with repeated heating subsequent to that in an environment with chlorine ions present, so the high temperature salt damage resistance is maintained. By making the Si content of the Al—Si alloy 10.5 mass % or more, a dense intermetallic compound layer superior in flaw resistance and superior in high temperature oxidation resistance and high temperature salt damage resistance is formed between the protective film and matrix material after high temperature heating. Further, by making the contents of Mg and Si of the Al—Mg alloy and Al—Mg—Si alloy 0.3 mass % or more, it is possible to sufficiently form MgO or $SiO_2$ contributing to the high temperature oxidation resistance.

EXAMPLES

Example 1

Each composition of the silicone resin or silicone grease was prepared or thin flake-shaped or powder-shaped metal Al was added, then a solvent was added to obtain a coating for protective film coverings. Each coating was coated on various types of titanium substrates and dried to form protective films. The substrates formed with these protective films were subjected to various types of tests and evaluated for characteristics.

Table 1 shows the substrate used for the tests, the Si, C, and Al contents of the surface protective film, and the results of a continuous oxidation test. The dimensions of the samples used for the continuous oxidation test were thickness 1.5 mm×20 mm×20 mm. The continuous oxidation test measured the oxidation weight gain after heating the same test pieces at 600, 700, and 800° C. for 200 hours in the atmosphere. Further, a tensile test was performed at room temperature and 700° C. Further, Table 1 also shows the elongation in the C direction at room temperature and the 0.2% yield strength at 700° C.

TABLE 1

| Test No. | Substrate | Surface protective film layer Si, C, Al contents (mass %) | Oxidation weight gain after continuous atmospheric oxidation test $g/m^2$ | | | Room temperature elongation (C direction) | 700° C. 0.2% yield strength (L direction) | Remarks |
| --- | --- | --- | --- | --- | --- | --- | --- | --- |
| | | | 600° C. | 700° C. | 800° C. | | | |
| 1-1 | Ti—1Cu | Si: 38, C: 33, Al: — | 0.3 | 0.5 | 0.9 | 37% | 30 MPa | Inv. ex. |
| 1-2 | Ti—1Cu | Si: 40, C: 35, Al: — | 0.3 | 0.5 | 0.9 | 37% | 30 MPa | Inv. ex. |
| 1-3 | Ti—1Cu | Si: 32, C: 28, Al: 25 | 0.2 | 0.4 | 0.8 | 37% | 30 MPa | Inv. ex. |
| 1-4 | Ti—1Cu | Si: 29, C: 25, Al: 25 | 0.2 | 0.4 | 0.8 | 37% | 30 MPa | Inv. ex. |
| 1-5 | Ti—1.5Al | Si: 40, C: 35, Al: — | 0.3 | 0.5 | 0.9 | 30% | 28 MPa | Inv. ex. |
| 1-6 | Ti—1.5Al | Si: 38, C: 33, Al: — | 0.3 | 0.5 | 0.9 | 30% | 28 MPa | Inv. ex. |
| 1-7 | Ti—1.5Al | Si: 29, C: 25, Al: 25 | 0.2 | 0.4 | 0.8 | 30% | 28 MPa | Inv. ex. |
| 1-8 | Ti—1.5Al | Si: 32, C: 28, Al: 25 | 0.2 | 0.4 | 0.8 | 30% | 28 MPa | Inv. ex. |
| 1-9 | Ti—1Cu—0.5Nb | Si: 42, C: 36, Al: — | 0.1 | 0.2 | 0.4 | 37% | 30 MPa | Inv. ex. |
| 1-10 | Ti—1Cu—0.5Nb | Si: 38, C: 33, Al: — | 0.1 | 0.2 | 0.4 | 37% | 30 MPa | Inv. ex. |

TABLE 1-continued

| Test No. | Substrate | Surface protective film layer Si, C, Al contents (mass %) | Oxidation weight gain after continuous atmospheric oxidation test g/m² | | | Room temperature elongation (C direction) | 700° C. 0.2% yield strength (L direction) | Remarks |
|---|---|---|---|---|---|---|---|---|
| | | | 600° C. | 700° C. | 800° C. | | | |
| 1-11 | Ti—1Cu—0.5Nb | Si: 24, C: 21, Al: 37 | 0.05 | 0.1 | 0.2 | 37% | 30 MPa | Inv. ex. |
| 1-12 | Ti—1Cu—0.5Nb | Si: 32, C: 28, Al: 25 | 0.05 | 0.1 | 0.2 | 37% | 30 MPa | Inv. ex. |
| 1-13 | Ti—1Cu—1Al—0.5Nb | Si: 38, C: 33, Al: — | 0.1 | 0.2 | 0.4 | 30% | 37 MPa | Inv. ex. |
| 1-14 | Ti—1Cu—1Al—0.5Nb | Si: 42, C: 36, Al: — | 0.1 | 0.2 | 0.4 | 30% | 37 MPa | Inv. ex. |
| 1-15 | Ti—1Cu—1Al—0.5Nb | Si: 24, C: 21, Al: 37 | 0.05 | 0.1 | 0.2 | 30% | 37 MPa | Inv. ex. |
| 1-16 | Ti—1Cu—1Al—0.5Nb | Si: 32, C: 28, Al: 25 | 0.05 | 0.1 | 0.2 | 30% | 37 MPa | Inv. ex. |
| 1-17 | pure Ti type 2 | None | 7 | 28 | 299 | 32% | 15 MPa | Comp. ex. |
| 1-18 | Ti—1Cu | None | 7 | 27 | 236 | 37% | 30 MPa | Comp. ex. |
| 1-19 | Ti—1.5Al | None | 7 | 27 | 229 | 30% | 28 MPa | Comp. ex. |
| 1-23 | Fe—17Cr—0.5Mo—0.2Ti | None | 0.4 | 0.6 | 7 | 34% | 50 MPa | Comp. ex. |

Test Nos. 1-1 and 1-2 are Ti-1 mass % Cu substrates coated with coatings of mixtures of a silicone resin and toluene by brushing and dried at room temperature for 24 hours. The formed protective films had thicknesses of 20 μm, while the mass %'s of contents of Si and C were 38% and 33% in No. 1-1 and 40% and 35% in No. 1-2.

Test Nos. 1-3 and 1-4 are Ti-1 mass % Cu substrates coated with coatings of mixtures of a silicone resin, aluminum flakes, toluene, and xylene by spraying and dried at room temperature for 24 hours. The formed protective films had thicknesses of 15 μm, while the mass %'s of contents of Si, C, and Al were 32%, 28%, and 25% in No. 1-3 and 29%, 25%, and 25% in No. 1-4.

Test Nos. 1-5 and 1-6 are Ti-1.5 mass % Al substrates coated with coatings of mixtures of a silicone resin and toluene by brushing and dried at room temperature for 24 hours. The formed protective films had thicknesses of 30 μm, while the mass %'s of contents of Si and C were 40% and 35% in No. 1-5 and 38% and 33% in No. 1-6.

Test Nos. 1-7 and 1-8 are Ti-1.5 mass % Al substrates coated with coatings of mixtures of a silicone resin, aluminum flakes, toluene, and xylene by spraying and dried at room temperature for 24 hours. The formed protective films had thicknesses of 25 μm, while the mass %'s of contents of Si, C, and Al were 29% and 25% in No. 1-7 and 32%, 28%, and 25% in No. 1-8.

Test Nos. 1-9 and 1-10 are Ti-1 mass % Cu-0.5 mass % Nb substrates coated with coatings of mixtures of a silicone resin and toluene by brushing and dried at room temperature for 24 hours. The formed protective films had thicknesses of 55 μm, while the mass %'s of contents of Si and C were 42% and 36% in No. 1-9 and 38% and 33% in No. 1-10.

Test Nos. 1-11 and 1-12 are Ti-1 mass % Cu-0.5 mass % Nb substrates coated with coatings of mixtures of a silicone resin, aluminum flakes, toluene, and xylene by spraying and dried at room temperature for 24 hours. The formed protective films had thicknesses of 40 μm, while the mass %'s of contents of Si, C, and Al were 24%, 21%, and 37% in No. 1-11 and 32%, 28%, and 25% in No. 1-12.

Test Nos. 1-13 and 1-14 are Ti-1 mass % Cu-1 mass % Al-0.5 mass % Nb substrates coated with mixtures of a silicone resin and toluene by brushing and dried at room temperature for 24 hours. The formed protective films had thicknesses of 65 μm, while the mass %'s of contents of Si and C were 38% and 33% in No. 1-13 and 42% and 36% in No. 1-14.

Test Nos. 1-15 and 1-16 are Ti-1 mass % Cu-1 mass % Al-0.5 mass % Nb substrates coated with coatings of mixtures of a silicone resin, aluminum flakes, toluene, and xylene by spraying and dried at room temperature for 24 hours. The formed protective films had thicknesses of 40 μm, while the mass %'s of contents of Si, C, and Al were 24%, 21%, and 37% in No. 1-15 and 32%, 28%, and 25% in No. 1-16.

The Invention Example Nos. 1-1 to 1-16 had an oxidation weight gain after heating at 600 to 800° C. for 200 hours in the atmosphere smaller than Comparative Example No. 1-23, that is, the ferritic stainless steel SUS436J1L (Fe-17 mass % Cr-0.5 mass % Mo-0.2 mass % Ti) and therefore a superior oxidation resistance. The elongation at room temperature (C direction) was in each case, with the exception of Nos. 1-5 to 1-8, larger than pure titanium type 2, while the 0.2% yield strength at 700° C. was 2 times or more of that of pure titanium type 2. No. 1-5 to No. 1-8 had an elongation at room temperature (C direction) somewhat smaller than that of pure titanium type 2, but substantially equal, and a 0.2% yield strength at 700° C. of 1.5 times or more of that of pure titanium type 2. These can be said to be titanium substrates superior in oxidation resistance and high temperature salt damage resistance provided with both high temperature strength and workability at room temperature.

On the other hand, in each of Nos. 1-17 to 1-19 not coated with the protective film of the present invention, the oxidation weight gain after the continuous atmospheric oxidation test was two to three orders of magnitude greater than the present invention materials. Comparative Example 1-23 is the ferritic stainless steel SUS436J1L (Fe-17Cr-0.5Mo-0.2Ti) not formed with the protective film of the present invention. This material inherently has little oxidative weight gain, but even so has a greater oxidative weight gain compared with substrates formed with the protective film of the present invention.

Example 2-1

Thin flake-shaped or grain-shaped metal Al was added to a silicone resin or silicone grease to prepare each composition, then a solvent was added to this to obtain a coating. Each coating was coated on various types of titanium substrates, then heated to form protective films. The substrates formed with these protective films were subjected to various types of tests and evaluated for characteristics.

Table 2 and Table 3 show the titanium substrates used for the tests, the Al, Si, C contents (mass %) of the surface protective films, the size of the metal Al, the heating temperature after coating, the results of the adhesion evaluation test, and the results of the high temperature salt damage test (atmospheric heating test after deposition of chlorine ions). The adhesion was evaluated by a cross cut tape peeling test and a Dupont type impact test (both based on JIS K 5600).

The cross cut tape peeling test was performed by making six parallel cuts in a test piece of a thickness 1 mm×50 mm×70 mm coated with a surface protective film using equal distance spacers at intervals of 1 mm and making a further six parallel cuts at right angles with these cuts to prepare a lattice pattern of 100 1 mm squares, attaching a tape to this, then removing it, observing any peeling of the surface protective film by a jeweler's glass, and evaluating the number of square remaining without being peeled off.

The Dupont type impact test was performed by clamping a test piece of 1 mm×50 mm×70 mm of a sample coated with a surface protective film, with the coated surface up, between a striking die of a radius of 6.35 mm and a receiving table, dropping a weight of a mass of 500 g from a height of 500 mm on the striking die, and observing if there were any cracks, peeling, or other damage on the coated surface.

The test piece dimensions in the high temperature salt damage test were made a thickness 1 mm×20 mm×20 mm. The conditions for the high temperature salt damage test were immersion in 5% saline for 1 hour and heating at 700° C. for 23 hours in the atmosphere repeated 5 times, then observation of the cross-section of the sample and measurement of the rate of reduction of thickness at locations where the thickness was reduced the most. Further, a tensile test was conducted at room temperature and 700° C. The tables show the elongation in the C direction at room temperature and the 0.2% yield strength at 700° C.

TABLE 2

| Test no. | Substrate | Average size of contained Al | Heat temp./time | Protective film Si, C, Al contents (mass %) | Rate of reduction of thickness after 700° C. high temperature salt damage test (%) | Typical surface products after 700° C. high temperature salt damage test |
|---|---|---|---|---|---|---|
| 2-1-1 | Ti—1Cu | Thickness 0.5 μm width/length 7 μm | 180° C. 40 min | Al: 27, Si: 33, C: 28 | 2.1 | $Ti_3Al$, $Ti_5Si_3$, $SiO_2$, TiC |
| 2-1-2 | Ti—1Cu | Diameter 0.4 μm | 250° C. 15 min | Al: 26, Si: 30, C: 25 | 1.8 | $Ti_3Al$, $Ti_5Si_3$, $SiO_2$, TiC |
| 2-1-3 | Ti—1.5Al | Thickness 0.5 μm width/length 7 μm | 200° C. 20 min | Al: 27, Si: 33, C: 28 | 1.6 | $Ti_3Al$, $Ti_5Si_3$, $SiO_2$, TiC |
| 2-1-4 | Ti—1.5Al | Diameter 0.4 μm | 180° C. 40 min | Al: 26, Si: 30, C: 25 | 2.3 | $Ti_3Al$, $Ti_5Si_3$, $SiO_2$, TiC |
| 2-1-5 | Ti—1Cu—0.5Nb | Thickness 0.3 μm width/length 5 μm | 250° C. 15 min | Al: 37, Si: 24, C: 21 | 1.4 | $Ti_3Al$, $Al_2O_3$, $Ti_5Si_3$, $SiO_2$ |
| 2-1-6 | Ti—1Cu—0.5Nb | Diameter 0.6 μm | 250° C. 30 min | Al: 25, Si: 32, C: 28 | 1.5 | $Ti_3Al$, $Ti_5Si_3$, $SiO_2$, TiC |
| 2-1-7 | T—1.2Al—1Nb | Diameter 0.7 μm | 160° C. 50 min | Al: 26, Si: 29, C: 24 | 2.5 | $Ti_3Al$, $Ti_5Si_3$, $SiO_2$, TiC |
| 2-1-8 | Ti—0.8Cu—1Al | Thickness 0.5 μm width/length 7 μm | 250° C. 15 min | Al: 27, Si: 33, C: 28 | 1.3 | $Ti_3Al$, $Ti_5Si_3$, $SiO_2$, TiC |
| 2-1-9 | Ti—1Cu—1Al—0.5Nb | Thickness 0.3 μm width/length 5 μm | 200° C. 30 min | Al: 37, Si: 24, C: 21 | 1.8 | $Ti_3Al$, $Al_2O_3$, $Ti_5Si_3$, $SiO_2$ |
| 2-1-10 | Ti—1Cu—1Al—0.5Nb | Diameter 0.6 μm | 230° C. 20 min | Al: 25, Si: 32, C: 28 | 1.4 | $Ti_3Al$, $Ti_5Si_3$, $SiO_2$, TiC |
| 2-1-11 | Ti—1Cu | Thickness 3 μm width/length 35 μm | 250° C. 20 min | Al: 25, Si: 33, C: 30 | 2.1 | $Ti_3Al$, $Al_2O_3$, $Ti_5Si_3$, $SiO_2$ |
| 2-1-12 | Ti—1.5Al | Thickness 4 μm width/length 25 μm | 200° C. 30 min | Al: 25, Si: 33, C: 30 | 2.5 | $Ti_3Al$, $Al_2O_3$, $Ti_5Si_3$, $SiO_2$ |
| 2-1-13 | Ti—1Cu—0.5Nb | Diameter 25 μm | 200° C. 30 min | Al: 25, Si: 33, C: 30 | 2.1 | $Ti_3Al$, $Al_2O_3$, $Ti_5Si_3$, $SiO_2$ |
| 2-1-14 | Ti—1Cu—1Al—0.5Nb | Thickness 2 μm width/length 45 μm | 200° C. 30 min | Al: 25, Si: 33, C: 30 | 1.9 | $Ti_3Al$, $Al_2O_3$, $Ti_5Si_3$, $SiO_2$ |

| Test no. | No. of squares remaining after cross cut tape peeling test/100 | Dupont type impact test | Room temperature elongation (C direction) | 700° C. 0.2% yield strength (L direction) | Remarks |
|---|---|---|---|---|---|
| 2-1-1 | 100/100 | No cracks | 37% | 30 MPa | Inv. ex. |
| 2-1-2 | 100/100 | No cracks | 37% | 30 MPa | Inv. ex. |
| 2-1-3 | 100/100 | No cracks | 30% | 28 MPa | Inv. ex. |
| 2-1-4 | 100/100 | No cracks | 30% | 28 MPa | Inv. ex. |
| 2-1-5 | 100/100 | No cracks | 37% | 30 MPa | Inv. ex. |
| 2-1-6 | 100/100 | No cracks | 37% | 30 MPa | Inv. ex. |
| 2-1-7 | 100/100 | No cracks | 31% | 25 MPa | Inv. ex. |
| 2-1-8 | 100/100 | No cracks | 32% | 27 MPa | Inv. ex. |
| 2-1-9 | 100/100 | No cracks | 30% | 37 MPa | Inv. ex. |
| 2-1-10 | 100/100 | No cracks | 30% | 37 MPa | Inv. ex. |
| 2-1-11 | 100/100 | No cracks | 37% | 30 MPa | Inv. ex. |
| 2-1-12 | 100/100 | No cracks | 30% | 28 MPa | Inv. ex. |
| 2-1-13 | 100/100 | No cracks | 37% | 30 MPa | Inv. ex. |
| 2-1-14 | 100/100 | No cracks | 30% | 37 MPa | Inv. ex. |

TABLE 3

| Test no. | Substrate | Average size of contained Al | Heating temp./time | Protective film Si, C, Al contents (mass %) | Rate of reduction of thickness after 700° C. high temperature salt damage test (%) | Typical surface products after 700° C. high temperature salt damage test |
|---|---|---|---|---|---|---|
| 2-1-15 | Pure Ti type 2 | No protective film | | | 28.2 | $TiO_2$ |
| 2-1-16 | Ti—1Cu | No protective film | | | 15.1 | $TiO_2$ |
| 2-1-17 | Ti—1.5Al | No protective film | | | 14.9 | $TiO_2$ |
| 2-1-21 | Ti—1Cu | Diameter 50 μm | 200° C. 30 min | Al: 25, Si: 33, C: 30 | 6.4 | $Ti_3Al, Al_2O_3, Ti_5Si_3, SiO_2$ |
| 2-1-22 | Ti—1.5Al | Thickness 10 μm width/length 25 μm | 200° C. 30 min | Al: 25, Si: 33, C: 30 | 7.3 | $Ti_3Al, Al_2O_3, Ti_5Si_3, SiO_2$ |
| 2-1-23 | Fe—17Cr—0.5Mo—0.2Ti | No protective film | | | 27.9 | $FeO, Fe_3O_4, Fe_2O_3$ |

| Test no. | Remaining no. of squares of cross cut tape peeling test/100 | Dupont type impact test | Room temperature elongation (C direction) | 700° C. 0.2% yield strength (L direction) | Remarks |
|---|---|---|---|---|---|
| 2-1-15 | — | — | 32% | 15 MPa | Comp. ex. |
| 2-1-16 | — | — | 37% | 30 MPa | Comp. ex. |
| 2-1-17 | — | — | 30% | 28 MPa | Comp. ex. |
| 2-1-21 | 45/100 | Peeling | 37% | 30 MPa | Comp. ex. |
| 2-1-22 | 43/100 | Peeling | 30% | 28 MPa | Comp. ex. |
| 2-1-23 | — | — | 34% | 50 MPa | Comp. ex. |

Nos. 2-1-1 to 2-1-14 are titanium sheets covered with protective films of the present invention. These titanium sheets had a rate of reduction of thickness after a high temperature salt damage test of a small 3% or less in each case and a sufficient high temperature salt damage resistance, while the titanium sheets of Nos. 2-1-15 to 2-1-17 not covered by a protective film had large reductions of thickness after a high temperature salt damage test. The elongation at room temperature (C direction) was equal to or greater than that of pure titanium type 2 in each case, while the 0.2% yield strength at 700° C. was 1.5 times or more that of pure titanium type 2. These can be said to be titanium sheets covered with protective films superior in high temperature salt damage resistance provided with both high temperature strength and workability at room temperature.

On the other hand, in each of the titanium sheets of Nos. 2-1-21 and 2-1-22 with average sizes of metal Al contained in the protective films over the upper limit of the present invention, the adhesion of the protective film was poor. In the cross-cut peeling test, over half of the 1 mm squares peeled off. Peeling occurred even in the Dupont type impact test. Further, the rate of reduction of thickness after the high temperature salt damage test was larger than in the present invention, the high temperature salt damage resistance was insufficient, and the substrate was unsuitable for use for an automobile exhaust system.

With the ferritic stainless steel material of No. 2-1-23, the rate of reduction of thickness after the high temperature salt damage test was large and the substrate was unsuitable for use for an automobile exhaust system.

After the high temperature salt damage test, the substances formed on the surface were identified by X-ray diffraction. The main products determined as a result are shown in Table 2 and Table 3. In Nos. 2-1-1 to 2-1-14, one or more of $Al_2O_3$, $SiO_2$, TiC, Ti—Al intermetallic compounds, and Ti—Si intermetallic compounds were formed. On the other hand, in Nos. 2-1-15 to 2-1-17 formed with protective films, the surface products were almost all $TiO_2$ showing the progression of the oxidation. Further, in No. 2-1-23 where the substrate is a ferritic stainless steel material, Fe oxides were formed and oxidation progressed. Note that in Comparative Example Nos. 2-1-21 and 2-1-22, one or more of $Al_2O_3$, $SiO_2$, TiC, Ti—Al intermetallic compounds, and Ti—Si intermetallic compounds were formed, but the average size of the metal Al contained was over the upper limit of the present invention, so peeling of the protective film occurred in the impact test.

Note that the substrates of the present invention shown in Example 2-1 (Table 2 and Table 3) are all cold rolled annealed materials.

Example 2-2

Thin flake-shaped or grain-shaped metal Al of the sizes shown in Table 4 was added to a silicone resin to prepare each composition, then xylene was added to this to obtain a coating for a protective film covering. Each coating was coated on various types of titanium substrates, heated under the conditions shown in heating I to form a protective film, then further baked on under the conditions shown in heating II to prepare the test materials of Nos. 2-2-1 to 2-2-8.

The substrates formed with these protective films were subjected to various types of tests and evaluated for characteristics.

Table 4 shows the titanium substrates used for the tests, the treatment conditions of the substrates, the contents of Al, Si, and C of the surface protective films (mass %), the size of the Al, the heating conditions I after coating, the heating conditions II of baking, the results of the adhesion evaluation test, and the results of the high temperature salt damage test.

Note that the adhesion evaluation test and high temperature salt damage test were conducted by the same methods as in Example 2-1.

TABLE 4

| Test no. | Substrate | Treatment of substrate | Average size of contained Al | Heating I temp./time | Protective film Si, C, Al contents (mass %) | Heating II temp./time |
|---|---|---|---|---|---|---|
| 2-2-1 | Ti—1Cu | Cold rolling and annealing | Thickness 2 μm width/length 20 μm | 180° C. 40 min | Al: 26, Si: 34, C: 28 | 700° C. 20 min |
| 2-2-2 | Ti—1Cu—0.5Nb | Cold rolling and annealing | Diameter 20 μm | 250° C. 15 min | Al: 25, Si: 31, C: 25 | 650° C. 30 min |
| 2-2-3 | Ti—1.5Al | Cold rolling and annealing | Thickness 3 μm width/length 30 μm | 200° C. 20 min | Al: 26, Si: 34, C: 28 | 750° C. 10 min |
| 2-2-4 | Ti—1Cu—1Al—0.5Nb | Cold rolling and annealing | Diameter 15 μm | 180° C. 40 min | Al: 26, Si: 30, C: 25 | 600° C. 60 min |
| 2-2-5 | Ti—1Cu | Pickling | Thickness 2 μm width/length 20 μm | 200° C. 20 min | Al: 26, Si: 34, C: 28 | None |
| 2-2-6 | Ti—1Cu—0.5Nb | Pickling | Diameter 20 μm | 180° C. 40 min | Al: 25, Si: 31, C: 25 | 700° C. 20 min |
| 2-2-7 | Ti—1Cu | Sandblasting | Thickness 2 μm width/length 20 μm | 250° C. 15 min | Al: 36, Si: 25, C: 21 | None |
| 2-2-8 | Ti—1Cu—0.5Nb | Sandblasting | Diameter 20 μm | 250° C. 30 min | Al: 24, Si: 33, C: 28 | 650° C. 30 min |

| Test no. | Rate of reduction of thickness after 700° C. high temperature salt damage test (%) | Typical surface products after 700° C. high temperature salt damage test | Remaining no. of squares in crosscut peeling test/100 | Dupont type impact test | Remarks |
|---|---|---|---|---|---|
| 2-2-1 | 0.2 | $Ti_3Al$, $Al_2O_3$, $Ti_5Si_3$, $SiO_2$ | 100/100 | No cracks | Inv. ex. |
| 2-2-2 | 0.3 | $Ti_3Al$, $Al_2O_3$, $Ti_5Si_3$, $SiO_2$ | 100/100 | No cracks | Inv. ex. |
| 2-2-3 | 0.2 | $Ti_3Al$, $Al_2O_3$, $Ti_5Si_3$, $SiO_2$ | 100/100 | No cracks | Inv. ex. |
| 2-2-4 | 0.3 | $Ti_3Al$, $Al_2O_3$, $Ti_5Si_3$, $SiO_2$ | 100/100 | No cracks | Inv. ex. |
| 2-2-5 | 1.6 | $Ti_3Al$, $Ti_5Si_3$, $SiO_2$, TiC | 48/100 | Peeling | Comp. ex. |
| 2-2-6 | 0.4 | $Ti_3Al$, $Al_2O_3$, $Ti_5Si_3$, $SiO_2$ | 51/100 | Peeling | Comp. ex. |
| 2-2-7 | 1.4 | $Ti_3Al$, $Ti_5Si_3$, $SiO_2$, TiC | 63/100 | Peeling | Comp. ex. |
| 2-2-8 | 0.4 | $Ti_3Al$, $Al_2O_3$, $Ti_5Si_3$, $SiO_2$ | 56/100 | Peeling | Comp. ex. |

Nos. 2-2-1 to 2-2-4 are substrates treated by cold rolling and annealing. Specifically, they are substrates cold rolled from thicknesses of 3.5 mm to 1 mm, then heat treated in vacuum at 680° C. for 5 hours. On the other hand, Nos. 2-2-5 and 2-2-6 are substrates treated by sandblasting, then pickling. The pickling solution was a mixture of nitric acid and fluoric acid. Further, Nos. 2-2-7 and 2-2-8 are substrates treated by sandblasting. The particle size of the silica used for the sandblasting was F30 (JIS R6001-1998).

The test items and methods were the same as in Example 1. The adhesion was evaluated by a cross cut tape peeling test and a Dupont type impact test (both based on JIS K 5600) conducted after heating I.

Nos. 2-2-1 to 2-2-4 are titanium sheets covered with protective films of the present invention. Before being covered by the protective films, these titanium substrates were cold rolled and annealed. On the other hand, the substrates of Comparative Example Nos. 2-2-5 and 2-2-6 were finally treated by pickling, while the substrates of Nos. 2-2-7 and 2-2-8 were treated by just sandblasting. If comparing the adhesion of these, in both the cross cut tape peeling test and Dupont type impact test, the protective films of the substrates which were just pickled and were just sandblasted peeled off. Further, the Invention Nos. 2-2-1 to 2-2-4 with the addition of the heating II had a rate of reduction of thickness after the high temperature salt damage test of a small 0.3% in each case, that is, a remarkable high temperature salt damage resistance. On the other hand, No. 2-2-5 and No. 2-2-6 without the addition of the heating II had a somewhat large reduction of thickness after the high temperature salt damage test.

Example 3

Thin flake-shaped or grain-shaped Al alloy was added to a silicone resin to prepare each composition, then a solvent was added to this to obtain a coating for a protective film covering. Each coating was coated on various types of titanium substrates and heated to form protective films. The substrates formed with these protective films were subjected to various types of tests and evaluated for characteristics.

Table 5 and Table 6 show the substrates used for the tests, the contents of the ingredients of the Al alloy dispersed in the silicone resin (mass %) and their sizes, the heating temperature after coating, the result of the adhesion evaluation test, the results of the high temperature oxidation test, the results of the high temperature salt damage test (atmospheric heating test after deposition of chlorine ions), and the results of flaw resistance. The adhesion was evaluated by a cross cut tape peeling test and a Dupont type impact test (both based on JIS K 5600).

The cross cut tape peeling test was performed by making six parallel cuts in a test piece of a thickness 1 mm×50 mm×70 mm coated with a surface protective film using equal distance spacers at intervals of 1 mm and making a further six parallel cuts at right angles with these cuts to prepare a lattice pattern of 100 1 mm squares, attaching a tape to this, then removing it, observing any peeling of the surface protective film by a jeweler's glass.

The Dupont type impact test was performed by clamping a test piece of 1 mm×50 mm×70 mm of a sample coated with a surface protective film, with the coated surface up, between a striking die of a radius of 6.35 mm and a receiving table, dropping a weight of a mass of 500 g from a height of 500 mm on the striking die, and observing if there were any cracks, peeling, or other damage on the coated surface.

The high temperature salt damage test was performed by treating a test piece of a thickness of 1 mm×width of 20 mm×length of 20 mm coated with a surface protective film by immersion in 5% saline for 1 hour and heating at 700° C. for 23 hours repeated 5 times, then observing the cross-section of the sample and measuring the maximum rate of reduction of thickness where the thickness is reduced the most.

The flaw resistance test was performed by after the above high temperature salt damage test by making a cross-shaped flaw to a depth equal to the coated thickness by a superhard scriber in the sample surface, performing the 700° C. high temperature salt damage test again, observing the cross-section of the sample of the part with the flaw after the test, and measuring the rate of reduction of thickness at the location where the thickness was reduced the most.

TABLE 5

| Sample no. | Substrate | Al alloy (numbers: mass %) | Al alloy average particle size (μm) | Content of Al alloy in protective film as a whole (mass %) | Coating thickness (μm) | Heating temp./time | Oxidation weight gain after heating at 700° C., 200 h in atmosphere (mg/cm$^2$) |
|---|---|---|---|---|---|---|---|
| 3-1 | Pure Ti type 2 | Al—12Si | 2 | 15 | 4 | 180° C. 40 min | 0.35 |
| 3-2 | Ti—1Cu | Al—20Si | 14 | 23 | 15 | 250° C. 15 min | 0.31 |
| 3-3 | Ti—1.5Cu | Al—27Si | 28 | 32 | 16 | 200° C. 20 min | 0.25 |
| 3-4 | Ti—1.5Al | Al—11Si | 3 | 36 | 72 | 180° C. 40 min | 0.36 |
| 3-5 | Ti—1Cu—0.5Nb | Al—16Si | 15 | 33 | 11 | 250° C. 15 min | 0.23 |
| 3-6 | Ti—1Cu—2Al | Al—35Si | 26 | 17 | 30 | 250° C. 30 min | 0.22 |
| 3-7 | Ti—1.2Al—1Nb | Al—24Si | 9 | 25 | 57 | 160° C. 50 min | 0.39 |
| 3-8 | Ti—0.8Cu—1Al | Al—12Si | 20 | 37 | 8 | 250° C. 15 min | 0.21 |
| 3-9 | Ti—1Cu—1Al—0.5Nb | Al—20Si | 14 | 27 | 12 | 200° C. 30 min | 0.29 |
| 3-10 | Ti—3Al—2.5V | Al—18Si | 19 | 14 | 44 | 230° C. 20 min | 0.24 |
| 3-11 | Pure Ti type 2 | No protective film | | | | | 2.95 |
| 3-12 | Ti—1Cu | No protective film | | | | | 2.81 |
| 3-13 | Ti—1.5Al | No protective film | | | | | 2.85 |
| 3-14 | Ti—1Cu—0.5Nb | Al—20Si | 22 | 55 | 15 | 200° C. 30 min | 0.66 |
| 3-15 | Ti—0.8Cu—1Al | Al—15Si | 45 | 37 | 80 | 200° C. 30 min | 1.26 |
| 3-16 | Ti—1Cu | Al—5Si | 21 | 7 | 15 | 200° C. 30 min | 0.41 |
| 3-17 | Ti—1Cu | Al—4Si | 15 | 26 | 19 | 250° C. 20 min | 0.45 |

| Sample no. | Rate of reduction of thickness after 700° C. high temperature salt damage test (%) | Rate of reduction of thickness after 700° C. high temperature salt damage retest after flaw (%) | Typical surface products after 700° C. high temperature salt damage test | Remaining no. of squares in cross-cut tape peeling test/100 | Dupont type impact test | Remarks |
|---|---|---|---|---|---|---|
| 3-1 | 1.5 | 1.8 | Ti$_3$Al, Al$_2$O$_3$, Ti$_5$Si$_3$, SiO$_2$ | 100/100 | No cracks | Inv. ex. |
| 3-2 | 1.3 | 1.7 | Ti$_3$Al, Al$_2$O$_3$, Ti$_5$Si$_3$, SiO$_2$ | 100/100 | No cracks | Inv. ex. |
| 3-3 | 1.1 | 1.3 | Ti$_3$Al, Al$_2$O$_3$, Ti$_5$Si$_3$, SiO$_2$ | 100/100 | No cracks | Inv. ex. |
| 3-4 | 1.6 | 1.9 | Ti$_3$Al, Al$_2$O$_3$, Ti$_5$Si$_3$, SiO$_2$ | 100/100 | No cracks | Inv. ex. |
| 3-5 | 1.0 | 1.3 | Ti$_3$Al, Al$_2$O$_3$, Ti$_5$Si$_3$, SiO$_2$ | 100/100 | No cracks | Inv. ex. |
| 3-6 | 1.1 | 1.3 | Ti$_3$Al, Al$_2$O$_3$, Ti$_5$Si$_3$, SiO$_2$ | 100/100 | No cracks | Inv. ex. |
| 3-7 | 1.8 | 2.0 | Ti$_3$Al, Al$_2$O$_3$, Ti$_5$Si$_3$, SiO$_2$ | 100/100 | No cracks | Inv. ex. |
| 3-8 | 0.9 | 1.1 | Ti$_3$Al, Al$_2$O$_3$, Ti$_5$Si$_3$, SiO$_2$ | 100/100 | No cracks | Inv. ex. |
| 3-9 | 1.3 | 1.6 | Ti$_3$Al, Al$_2$O$_3$, Ti$_5$Si$_3$, SiO$_2$ | 100/100 | No cracks | Inv. ex. |

TABLE 5-continued

| | | | | | | |
|---|---|---|---|---|---|---|
| 3-10 | 1.0 | 1.2 | Ti$_3$Al, Al$_2$O$_3$, Ti$_5$Si$_3$, SiO$_2$ | 100/100 | No cracks | Inv. ex. |
| 3-11 | 28.2 | — | TiO$_2$ | — | — | Comp. ex. |
| 3-12 | 15.1 | — | TiO$_2$ | — | — | Comp. ex. |
| 3-13 | 14.9 | — | TiO$_2$ | — | — | Comp. ex. |
| 3-14 | 3.1 | — | Ti$_3$Al, Al$_2$O$_3$ | 38/100 | Peeling | Comp. ex. |
| 3-15 | 12.3 | — | Ti$_3$Al, Ti$_5$Si$_3$ | 44/100 | Peeling | Comp. ex. |
| 3-16 | 2.1 | 10.8 | Ti$_3$Al, Al$_2$O$_3$ | 82/100 | Peeling | Comp. ex. |
| 3-17 | 2.5 | 11.3 | Ti$_3$Al, Al$_2$O$_3$ | 74/100 | Peeling | Comp. ex. |

TABLE 6

| Sample no. | Substrate | Al alloy (numbers: mass %) | Al alloy average particle size (μm) | Content of Al alloy in protective film as a whole (mass %) | Coating thickness (μm) | Heating temp./time | Oxidation weight gain after heating at 700° C., 200 h in atmosphere (mg/cm$^2$) |
|---|---|---|---|---|---|---|---|
| 3-18 | Ti—1Cu | Al—10Si—1Mg | 15 | 32 | 15 | 180° C. 40 min | 0.35 |
| 3-19 | Ti—1Cu | Al—12Si<br>Mg$_3$SiO$_4$O$_{10}$(OH)$_2$ | 11<br>10 | 25<br>5 | 15 | 180° C. 40 min | 0.26 |
| 3-20 | Ti—1Cu | Al—12Si<br>Al—10Mg | 11<br>10 | 25<br>5 | 15 | 180° C. 40 min | 0.31 |
| 3-21 | Ti—1Cu | Al—12Si<br>Al—7Si—0.4Mg | 11<br>10 | 25<br>5 | 15 | 180° C. 40 min | 0.34 |
| 3-22 | Ti—1Cu | Al—12Si<br>Al—8Si—0.5Mg | 11<br>10 | 25<br>5 | 15 | 180° C. 40 min | 0.41 |
| 3-23 | Ti—1Cu | Al—12Si<br>Mg$_3$SiO$_4$O$_{10}$(OH)$_2$ | 11<br>10 | 25<br>5 | 15 | 180° C. 40 min | 0.29 |

| Sample no. | Rate of reduction of thickness after 700° C. high temperature salt damage test (%) | Rate of reduction of thickness after 700° C. high temperature salt damage retest after flaw (%) | Typical surface products after 700° C. high temperature salt damage test | Remaining no. of squares in cross-cut tape peeling test/100 | Dupont type impact test | Remarks |
|---|---|---|---|---|---|---|
| 3-18 | 1.3 | 1.5 | Ti$_3$Al, Al$_2$O$_3$, Ti$_5$Si$_3$, SiO$_2$, MgO | 100/100 | No cracks | Inv. ex. |
| 3-19 | 0.9 | 1.2 | Ti$_3$Al, Al$_2$O$_3$, Ti$_5$Si$_3$, SiO$_2$, MgO | 100/100 | No cracks | Inv. ex. |
| 3-20 | 0.8 | 1.1 | Ti$_3$Al, Al$_2$O$_3$, Ti$_5$Si$_3$, SiO$_2$, MgO | 100/100 | No cracks | Inv. ex. |
| 3-21 | 1.2 | 1.4 | Ti$_3$Al, Al$_2$O$_3$, Ti$_5$Si$_3$, SiO$_2$, MgO | 100/100 | No cracks | Inv. ex. |
| 3-22 | 1.1 | 1.3 | Ti$_3$Al, Al$_2$O$_3$, Ti$_5$Si$_3$, SiO$_2$, MgO | 100/100 | No cracks | Inv. ex. |
| 3-23 | 0.8 | 1.0 | Ti$_3$Al, Al$_2$O$_3$, Ti$_5$Si$_3$, SiO$_2$, MgO | 100/100 | No cracks | Inv. ex. |

Nos. 3-1 to 3-10 of Table 5 are titanium sheets covered with protective films of the present invention. These titanium sheets had a maximum rate of reduction of thickness after the high temperature salt damage test of a small 1.5% or less in each case or a sufficient high temperature salt damage resistance, while the titanium sheets of Nos. 3-11 to 3-13 not covered with a protective film had a large reduction of thickness after the high temperature salt damage test. Further, in the titanium sheets covered with protective films of the present invention, the maximum rate of reduction of thickness was a small 2.5% in each case or a sufficient high temperature salt damage resistance and durability even when making a flaw and performing the high temperature salt damage test again after the high temperature salt damage test.

On the other hand, in No. 3-14 with a content of Al alloy with respect to the protective film as a whole over the range of the present invention and as a result with a small silicone content, the adhesion of the protective film was poor, over half of the 1 mm squares were peeled off in the cross cut tape peeling test, and peeling occurred in the Dupont type impact test as well. Further, in No. 3-15 with an average particle size of the Al alloy, a content with respect to the protective film, and a coating thickness over the upper limits of the present invention, the maximum rate of reduction after the high temperature salt damage test was one order of magnitude greater than the present invention, that is, the high temperature salt damage resistance was insufficient. In No. 3-16 with an amount of Al alloy in the protective film below the lower limit of the present invention and in No. 3-17 with a content of Si in the Al alloy below the lower limit of the present invention, the maximum rate of reduction of thickness at the time of introduction of a flaw and performing the high temperature salt damage test again was large and the flaw resistance was inferior to the titanium sheet covered with a protective film of the present invention.

Nos. 3-19 to 3-23 of Table 6 are examples of the case containing, in addition to an Al—Si alloy, one or more of MgO, $SiO_2$, an Al—Mg alloy, an Al—Mg—Si alloy, and other dispersed substances. No. 3-18 is an example of the case of containing only an Al—Mg—Si alloy as a dispersed substance. No. 3-19 and No. 3-23 are cases containing an Al-12 mass % Si alloy and hydrous magnesium silicate in contents with respect to the protective film as a whole of 25 mass % and 5 mass %. An extremely superior high temperature salt damage resistance in both the maximum rate of reduction of thickness after the initial high temperature salt damage test and the maximum rate of reduction of thickness after the retesting after introduction of a flaw and durability were exhibited.

No. 3-20 is the case containing an Al-12 mass % Si and an Al-10 mass % Mg alloy in contents with respect to the protective film as a whole of 25 mass % and 5 mass %, while Nos. 3-21 and 3-22 are cases containing an Al-12 mass % Si alloy and an Al—Mg—Si alloy in contents with respect to the protective film as a whole of 25 mass % and 5 mass %. In each case, both the maximum rate of reduction of thickness after the initial high temperature salt damage test and the maximum rate of reduction of thickness after the retesting after the introduction of a flaw were smaller than the cases of the present invention of Example No. 3-1 to No. 3-10, and extremely superior high temperature salt damage resistance and durability were exhibited.

After the high temperature salt damage test, the substances formed on the surface were identified by X-ray diffraction. The main produced substances found as a result are shown in Table 5 and Table 6. In Nos. 3-1 to 3-10, $Al_2O_3$, $SiO_2$, Ti—Al intermetallic compounds, and Ti—Si intermetallic compounds were formed. On the other hand, in Nos. 3-11 to 3-13 not formed with the protective film, the surface products were almost all $TiO_2$ and oxidation progressed. Further, in No. 3-14, $Al_2O_3$ and Ti—Al intermetallic compounds were formed, but the content of the Al alloy with respect to the protective film as a whole was over the range of the present invention and as a result the silicone was small, so the adhesion of the film was poor and peeling occurred in the cross cut tape peeling test and Dupont type impact test. In No. 3-15, Ti—Al intermetallic compounds and Ti—Si intermetallic compounds were formed, but the average particle size of the dispersed substances, the content with respect to the protective film as a whole, and the coating thickness were over the upper limits of the present invention, so peeling of the protective film occurred in the cross cut tape peeling test and the impact test.

In Nos. 3-16 and 3-17, Ti—Al intermetallic compounds and $Al_2O_3$ were formed, but the maximum rate of reduction of thickness at the time of making flaws and performing the high temperature salt damage test again was large and the flaw resistance of the protective film was inferior to the Invention Nos. 3-1 to 3-10.

In Nos. 3-19 to 3-23 containing, in addition to the Al—Si alloy, one or more of MgO, $SiO_2$, Al—Mg alloy, Al—Mg—Si alloy, etc., one or more of $Al_2O_3$, $SiO_2$, Ti—Al intermetallic compounds, and Ti—Si intermetallic compounds were formed, MgO was formed or present, the maximum rates of reduction of thickness after the high temperature salt damage test and after the retesting after introduction of a flaw were small, and protective films extremely superior in high temperature salt damage resistance and flaw resistance were obtained.

The invention claimed is:

1. A method of production of a titanium sheet covered with a protective film superior in high temperature oxidation resistance and high temperature salt damage resistance, the method comprising coating a silicone resin or silicone grease prepared to contain Si: 15 to 55 mass %, C: 10 to 45 mass % and a metal Al alloy on a titanium sheet by brushing or spraying to form a protective film on the surface of the titanium sheet, and heating said titanium sheet covered with the protective film at 600° C. to 800° C. for 30 minutes to 10 hours to form at least one or more compounds of $Al_2O_3$, $SiO_2$, Ti—Si and Ti-Al at the interface of the protective film and titanium substrate, wherein the metal Al alloy of a thin flake shape with an average thickness of 0.1 to 5 μm and an average width or average length of 1 to 50 μm or of a grain shape with an average particle size of 0.1 to 30 μm is dispersed in the silicone resin in a ratio of 10 to 40 mass %, said metal Al alloy being one or more of an Al—Si alloy comprised of Si: 10.5 to 30 mass % and having a balance of Al and unavoidable impurities, an Al—Mg alloy comprised of Mg: 0.3 to 13.0 mass % and having a balance of Al and unavoidable impurities, and an Al—Mg—Si alloy comprised of Mg: 0.3 to 13.0 mass % and Si: 0.3 to 13.0 mass % and having a balance of Al and unavoidable impurities.

2. The method of production of a titanium sheet covered with a protective film superior in high temperature oxidation resistance and high temperature salt damage resistance as set forth in claim 1 characterized in that said titanium sheet contains one or both of Cu: 0.5 to 2.1 mass % and Al: 0.4 to 2.5 mass % and has a balance of titanium and unavoidable impurities.

3. The method of production of a titanium sheet covered with a protective film superior in high temperature oxidation resistance and high temperature salt damage resistance as set forth in claim 2, characterized in that said titanium sheet further contains Nb: 0.3 to 1.1 mass %.

4. The method of production of a titanium sheet covered with a protective film superior in high temperature oxidation resistance and high temperature salt damage resistance as set forth in claim 1 characterized in that said titanium sheet before covering by said protective film is a cold rolled, then vacuum annealed material.

5. A method of production of a titanium sheet covered with a protective film superior in high temperature oxidation resistance and high temperature salt damage resistance, the method comprising coating a silicone resin or silicone grease, prepared by making a metal Al alloy of a thin flake shape with an average thickness of 0.1 to 5 μm and an average width or average length of 1 to 50 μm or of a grain shape with an average particle size of 0.1 to 30 μm dispersed in a silicone resin or silicone grease so as to give a composition of Si: 15 to 55 mass %, C: 10 to 45 mass %, and a metal Al alloy, on a titanium sheet by brushing or spraying and heating at 150° C. to 300° C. for 5 to 60 minutes, and further heating at 600° C. to 800° C. for 30 minutes to 10 hours to form both the protective film on the titanium sheet surface and at least one or more compounds of $Al_2O_3$, $SiO_2$, Ti—Si and Ti—Al at the interface of the protective film and titanium substrate, wherein the metal Al alloy of a thin flake shape with an average thickness of 0.1 to 5 μm and an average width or average length of 1 to 50 μm or of a grain shape with an average particle size of 0.1 to 30 μm is dispersed in the silicone resin in a ratio of 10 to 40 mass %, said metal Al alloy being one or more of an Al—Si alloy comprised of Si: 10.5 to 30 mass % and having a balance of Al and unavoidable impurities, an Al—Mg alloy comprised of Mg: 0.3 to 13.0 mass % and having a balance of Al and unavoidable impurities, and an Al—Mg—Si alloy comprised of Mg: 0.3 to 13.0 mass % and Si: 0.3 to 13.0 mass % and having a balance of Al and unavoidable impurities.

\* \* \* \* \*